UNITED STATES PATENT OFFICE.

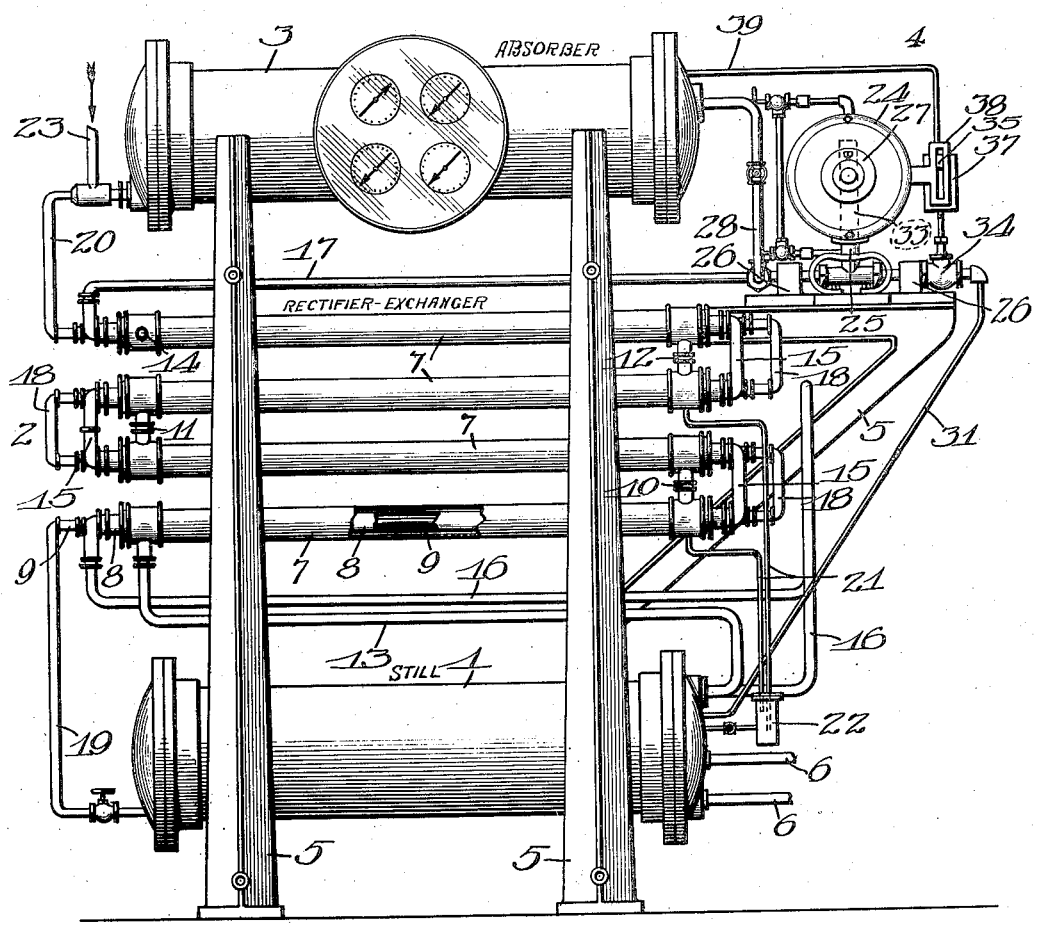

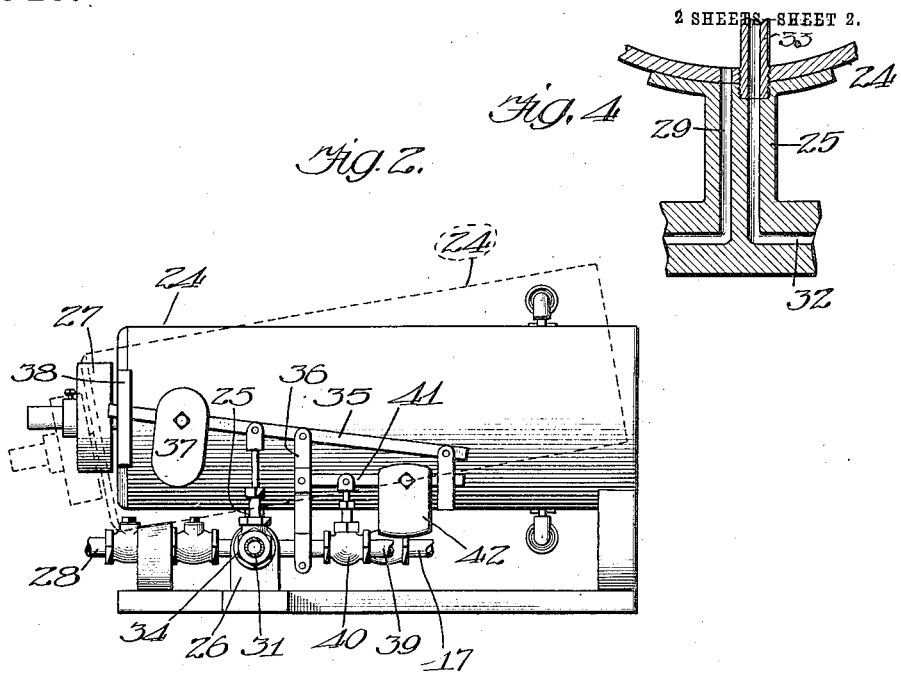

THOMAS C. McKEE, OF CHICAGO, ILLINOIS.

AMMONIA REFRIGERATING APPARATUS.

943,040. Specification of Letters Patent. Patented Dec. 14, 1909.

Application filed December 21, 1907. Serial No. 407,468.

*To all whom it may concern:*

Be it known that I, THOMAS C. McKEE, a citizen of the United States, residing at Chicago, in the county of Cook and State of Illinois, have invented certain new and useful Improvements in Ammonia Refrigerating Apparatus, of which the following is a specification.

This invention relates especially to ammonia refrigerating apparatus of the absorption type. Such apparatus commonly comprises a temperature exchanger for transferring some of the heat contained in the hot weak liquor going to the absorber, to the cold strong liquor going to the generator or still. It also is usual to provide a device called a rectifier for removing water from the hot gas passing from the still to the condenser.

One of the objects of my invention is to provide a unitary apparatus performing all of the functions of the temperature - exchanger and the rectifier.

In absorption ammonia refrigerating apparatus as heretofore constructed an ordinary steam pump has been employed for returning the cold strong aqua ammonia to the still.

It is one of the objects of my invention to eliminate the necessity for the application of mechanical power for this purpose, and to this end I substitute a return trap for the pump heretofore employed.

Other objects and advantages of the invention will appear from the following specification.

In the accompanying drawings, Figure 1 is a side elevation of part of an absorption ammonia refrigerating apparatus embodying the features of my invention. Fig. 2 is a side elevation of a return trap comprised in said apparatus. Fig. 3 is a view of said trap taken from the side opposite to that shown in Fig. 2. Fig. 4 is a fragmental detail view of the trap. Fig. 5 is an end elevation of the still.

In the embodiment selected for illustration, the still 1, the combination rectifier and exchanger 2, the absorber 3 and the return trap 4 are compactly arranged upon and supported by a framework comprising the members 5, but it will be understood that the parts of the apparatus may be located in any convenient and suitable position. The still 1 is of common construction, its liquid contents being heated in any suitable way, as, for example, by steam pipes 6. The rectifier-exchanger 2, in this instance, comprises a system of piping providing separate conductors for the hot ammonia, the cold strong aqua ammonia, and the hot weak aqua ammonia. Preferably said conductors are concentrically arranged with the conductor for the strong cold aqua ammonia between the other two conductors, the cold strong aqua ammonia traveling downward from the return trap to the still, and the ammonia gas and hot weak liquor traveling upward.

The conductors for the hot ammonia gas, the cold strong liquor, and the hot weak liquor are indicated by the numerals 7, 8 and 9, respectively. As shown in Fig. 1, the rectifier-exchanger is arranged four pipes high, the two lower pipes 7 being connected at one end by the cross connection 10, the two middle pipes 7 being connected at the opposite end of the apparatus by the connection 11, and the two upper pipes 7 being joined at the right hand end of the apparatus by the fitting 12. The lowermost pipe 7 is connected with the still 1 through the pipe 13, the uppermost pipe 7 communicating with the condenser (not shown) at 14.

The two lower pipes 8 and the two upper pipes 8 are connected at the right-hand end of the apparatus, and the two middle pipes 8 at the left-hand end of the apparatus by the return bends 15. The lowermost pipe 8 is connected with the generator 1 by the pipe 16, said pipe being bent upwardly to a suitable height before being led into the still, in order that a quantity of the cold strong liquor may be contained in the rectifier-exchanger at all times. The upper pipe 8 communicates with the return trap 4 through the medium of the pipe 17.

The two lower pipes 9 and the two upper pipes 9 are united at the right-hand end of the machine by the return bends 18. The two middle pipes 9 are connected by a similar return bend 18. The hot weak liquor passes from the generator 1 to the lowermost pipe 9 through the pipe 19, and the cooled weak liquor leaves the uppermost pipe 9 and is conducted to the absorber 3 by way of the pipe 20. The moisture precipitated in the pipes 7 is drained off and returned to the still 1 through pipes 21, a drain bottle 22 of any suitable construction being provided to prevent the ammonia gas from short-circuiting through said pipes.

The absorber 3 is of any suitable character, the anhydrous gas from the refrigerating coils or other cooling devices being returned to the absorber through the pipe 23. The weak aqua ammonia entering the absorber 3 through the pipe 20 absorbs said gas and is cooled by means of coils of pipe (not shown) through which cold water is circulated, or in any other suitable way.

The return trap 4 may be of any common construction. As herein shown it comprises a drum 24 rigidly attached to a member 25 which serves to pivotally support the drum in the bearings 26. An adjustable weight 27 tends to hold the drum 24 in receiving position, as shown in dotted lines in Fig. 2. The drum is connected with the absorber 3 through a pipe 28 which extends through one of the bearings 26 and communicates with the drum through a passage 29 in the member 25. The drum is connected with the rectifier-exchanger 2 through the pipe 17 and the passage 29. Double swing check valves 30 preferably are provided in the pipes 17 and 28. The interior of the drum 24 is arranged to be placed under the same pressure as exists in the still 1 through a pipe 31 communicating with a passage 32 in the member 25, said passage being continued in a pipe 33 extending to a point near the top of the drum. A valve 34 in the pipe 31 is arranged to be operated by a lever 35 pivotally mounted in the support 36 and carrying an adjustable weight 37. One end of said lever extends through a guide 38 fixed to the drum 24, the construction being such that when the drum tilts into the discharging position (as indicated in full lines in the drawings) said end of the lever 35 is lifted and the valve 34 opened to equalize the pressures in the still 1 and the drum 24.

39 is a pipe leading from the absorber 3 to the drum, through the passage 32 and the pipe 33.

40 is a valve in the pipe 39 arranged to be operated by an arm 41 pivotally mounted in the support 36. Upon the arm 41 is adjustably mounted a weight 42. When the drum 24 is in the receiving position, the valve 40 is held open, the arm 41 being connected to one end of the weighted lever 35, the weight 37 tending to open the valve 40 against the force exerted by the weight 42. When the drum tilts into the discharging position, the arm 41 is thrown downward to close the valve 40.

In operation, the heat to which the aqua ammonia is subjected in the still 1 drives off ammonia gas which passes through the pipe 13 into the rectifier-exchanger 2. Here its temperature is reduced by the cold strong liquor flowing through the pipes 8 sufficiently to condense the water vapor carried by the gas, the condensation being drained away through the pipes 21 and returned to the still. The anhydrous ammonia gas leaves the rectifier-exchanger through the pipe 14 and passes to the condenser. The liquor in the still 1, becoming heavier as the gas is driven off, settles to the bottom of the still and is forced by the pressure within said still through the pipe 19 into the rectifier-exchanger, wherein it is cooled by the cold strong liquor flowing downward through the pipes 8. The cooled weak aqua ammonia is conducted from the rectifier-exchanger to the absorber 3 by the pipe 20, where it is brought in contact with anhydrous ammonia gas returned from the system through the pipe 23, and where said liquor is further cooled by the means provided in said absorber for this purpose. The cold strong aqua ammonia flows from the absorber through the pipe 28 and the passage 29 into the drum 24. When the level of the liquor in the drum reaches a certain point, said liquor overbalances the weight 27, causing the drum to tilt into the position shown in full lines in the various figures. Said tilting movement causes the valve 34 to be opened and the valve 40 to be closed, equalizing the pressures in the drum 24 and the still, and causing the cold strong aqua ammonia in said drum to flow through the passage 29 past the check valves 30 and through the pipe 17 into the rectifier-exchanger, the pressure of the liquor closing the check valves 30 in the pipe 28. When the level of the liquor in the drum 24 has been reduced to a certain point, said drum tilts into the receiving position, shown in dotted lines in Fig. 2, closing the valve 34 and opening the valve 40. As the cold strong aqua ammonia flows downward through the pipes 8 of the rectifier-exchanger, it cools the gas in the pipes 7 and the hot weak liquor in the pipes 9, being itself warmed preliminary to its entrance into the still 1.

It will be seen that my invention removes the necessity for the application of mechanical power to effect the return of aqua ammonia to the still. The faster the weak liquor leaves the still the oftener the trap 4 will be operated to deliver strong aqua ammonia to the still, automatic regulation of said delivery being thus effected by the trap.

The flow of cold aqua ammonia through the rectifier-exchanger depending upon the rate at which gas and hot weak liquor leave the still, it will be seen that the flow of cooling liquid through the rectifier-exchanger is automatically proportioned to the quantity of fluids to be cooled. The greater the amount of fluids to be cooled the greater the quantity of cold aqua ammonia passed through the rectifier-exchanger.

The device 2 efficiently serves to effect both a temperature-exchange between the cold strong aqua ammonia and the hot weak aqua ammonia, and a removal of water vapor from the ammonia gas.

I desire it to be understood that in the practical manufacture of this apparatus I do not regard myself as limited to the precise construction herein described, inasmuch as many departures from said construction may be made within the scope of the invention.

I claim as my invention:

1. An ammonia refrigerating apparatus comprising a source of ammonia gas and hot weak liquor, a unitary rectifier-exchanger, and a source of cold strong liquor, said rectifier-exchanger comprising three substantially concentric pipes, the outer and inner pipes forming conductors for the ammonia gas and the hot weak liquor and communicating with the source of gas and weak liquor, and the middle pipe forming a conductor for the cold strong liquor and being connected to said source of cold strong liquor.

2. An ammonia refrigerating apparatus comprising a source of ammonia gas and hot weak liquor, a unitary rectifier-exchanger, and a source of cold strong liquor, said rectifier-exchanger comprising three substantially concentric pipes, the outer one forming a conductor for the ammonia gas and being connected to the source of ammonia gas and weak liquor, the middle pipe forming a conductor for the cold strong liquor and being connected with the source of strong liquor, and the inner pipe forming a conductor for the hot weak liquor and being connected with the source of ammonia gas and weak liquor, and means for draining water from the outer pipe.

3. An absorption ammonia refrigerating apparatus comprising a still; an absorber; a trap structurally separate from and independent of and located outside of said still and said absorber; a liquor pipe and an equalizing pipe connecting the absorber and the trap; and a liquor pipe and an equalizing pipe connecting the still and the trap.

4. An ammonia refrigerating apparatus comprising a still; a rectifier; means for delivering a cooling liquid to said rectifier; and connections between said still and said delivering means, the rapidity of operation of said delivering means being governed by the flow from said still through said connections.

THOMAS C. McKEE.

Witnesses:
C. P. HUNTER,
WM. D. OWENS.